March 11, 1947.  R. P. H. HINDS  2,417,162
MOTOR HEAD LAMP PLASTIC CASING
Filed July 24, 1943  3 Sheets-Sheet 1

INVENTOR.
REINHARD PAUL HENRY HINDS
BY
Stone, Artman & Bisson,
ATTYS.

March 11, 1947. R. P. H. HINDS 2,417,162
MOTOR HEAD LAMP PLASTIC CASING
Filed July 24, 1943 3 Sheets-Sheet 2

INVENTOR.
REINHARD PAUL HENRY HINDS.
BY
Stone, Artman & Bisson,
ATT'YS.

March 11, 1947.  R. P. H. HINDS  2,417,162
MOTOR HEAD LAMP PLASTIC CASING
Filed July 24, 1943  3 Sheets-Sheet 3
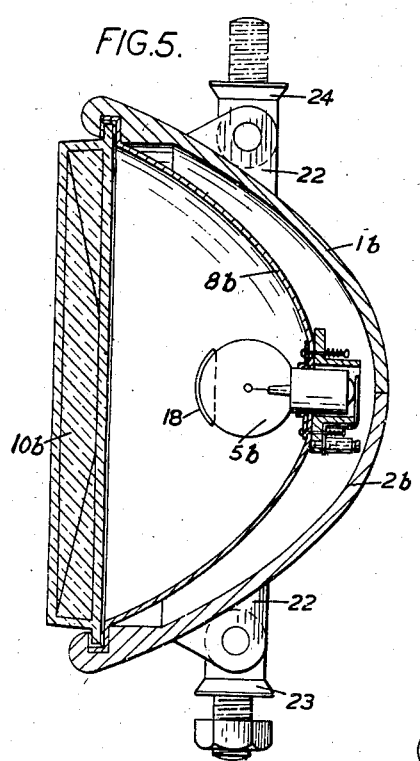
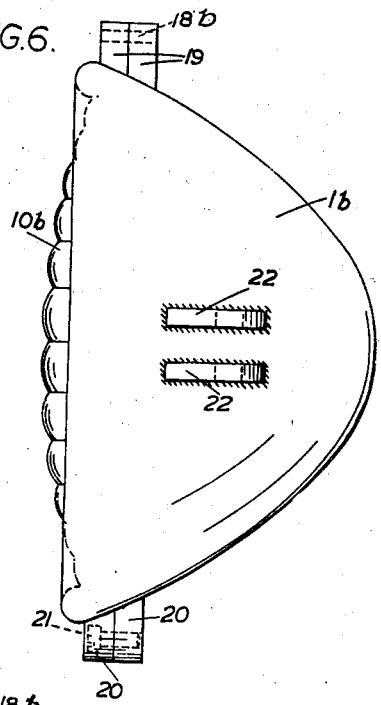
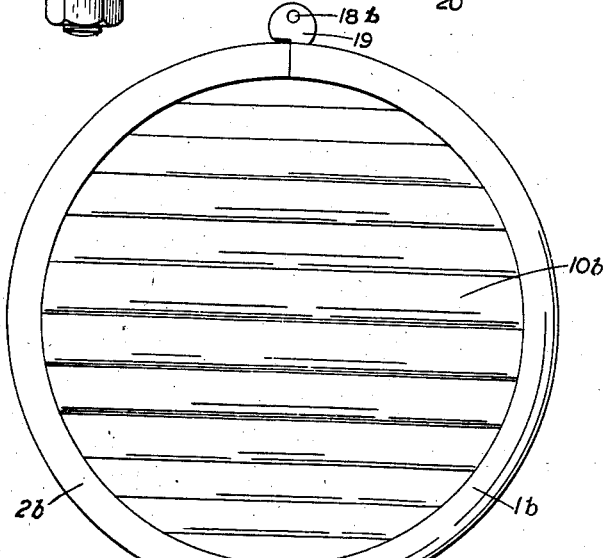
INVENTOR.
REINHARD PAUL HENRY HINDS.
BY
Stone, Artman & Bisson,
ATTYS.

Patented Mar. 11, 1947

2,417,162

UNITED STATES PATENT OFFICE 2,417,162

MOTOR HEAD LAMP PLASTIC CASING

Reinhard Paul Henry Hinds, Petts Wood, England

Application July 24, 1943, Serial No. 496,028
In Great Britain July 24, 1942

1 Claim. (Cl. 240—41)

This invention relates generally to industrial lamps, floodlights, lamp fittings in general, cycle, motor cycle and like lamps, and has particular reference to motor car head and auxiliary lamps.

The main object of the invention is to construct motor car head lamps and other lamps of the above kind, which are usually made from metal stampings, from plastic materials, and the invention comprises the method of manufacture which consists broadly in pressing and moulding the article in parts designed to be fitted together and securing the fitted parts by external mechanical means.

In the case of a motor car head lamp I mould or otherwise form the outer casing or body from plastic material, such as a synthetic resin, in what may for convenience be described as two quarter hollow spherical or parabolic parts in such a manner that they can be fitted together to constitute the complete hollow half sphere or paraboloid. The two parts are then fitted together and at the circular front of the article a flexible band is applied and secured by means of a screw bolt to hold the two parts firmly together. The edges of the pressings or mouldings where the two parts are fitted together are preferably provided with interfitting positioning ridges and channels and the lower of the two mouldings or pressings will, of course, be provided with an opening for permitting passage of the electric leads to the lamp to be located within the hollow structure.

In one construction according to the invention the inner concave wall of the lamp body is provided with a reflector, and this reflector, together with the front glass and lens, is secured in position by forming an internal groove in the front of the lamp body and providing the glass front or lens with a peripheral rim which fits in this groove. The rim of the reflector element is shaped to fit upon the peripheral rim of the glass front so that when the parts are assembled in position and the securing band tightened up the whole structure is rigidly connected together. The securing band may be provided at its opposing ends with brackets having depending lugs which accommodate the coupling bolt and screw by means of which the securing band is contracted to hold the parts together, and moreover the bolt serves as a hinge-pin to permit the angle of the lamp to be adjusted by its hinge bracket located in the centre of the two end brackets. The arrangement is preferably such that the lamp can be dipped or elevated through an angle of approximately 100°.

The lower half of the lamp body and the reflector are provided with registering openings through which the current carrying cable can be passed, these cables being carried by screw fitments and connected to the conducting elements of the lamp holder located within the lamp body. This lamp holder is provided with the usual socket for receiving the lamp bulb, and is slidably mounted on a base or block and is provided with a screw adjusting device accessible from the outside of the lamp body so that the focus lamp relative to the reflector can be adjusted.

The foregoing construction has the advantage that the lamps can be built up from simple plastic mouldings and when assembled the body will be relieved from all strains which will be taken by the securing band and its associated brackets and hinge support.

In order that the invention may be clearly understood and readily carried into practice some constructional forms of vehicle head lamp, in accordance with the invention, are illustrated, by way of example only, in the accompanying drawings, in which:

Figure 5 is a side elevation in section of a third construction of head lamp;

Figure 6 is a plan view thereof, and

Figure 7 is a front elevation.

Figure 1:
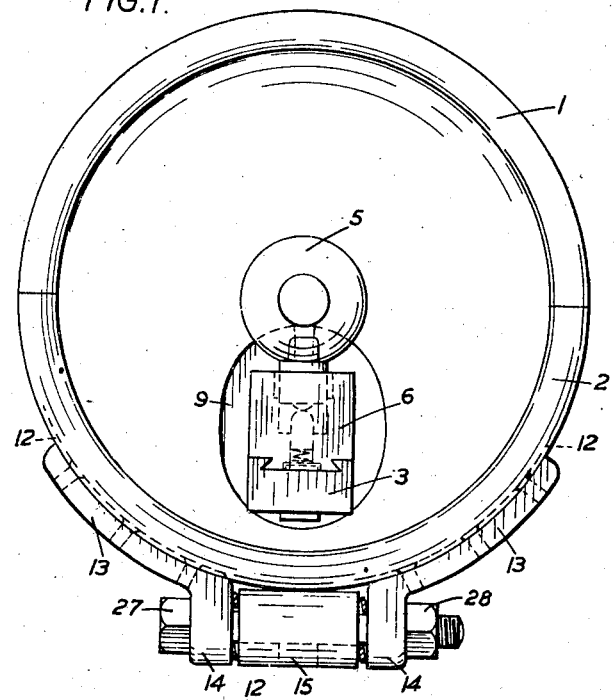
Figure 1 is a front elevation of one construction of head lamp according to the invention.
Figure 2:
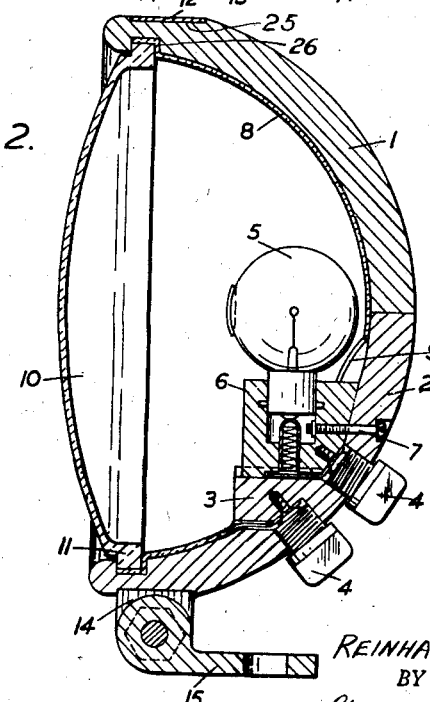
Figure 2 is a side elevation in section.

Referring to Figures 1 and 2, the lamp comprises a body portion of hemi-spherical or half paraboloid shape, which is divided diametrically into upper and lower halves 1 and 2 respectively. These two parts are moulded from plastic material, such as a synthetic resin, and when fitted together produce a hollow body of circular fronted aspect and either semi-circular or parabolic in side elevation. It is within the invention, however, to make the parts of any desired shape adapted when fitted together to make a box-like hollow body capable of receiving an optical light producing assembly, such as a reflector and lamp, with or without a front glass or lens.

The edges of the two parts 1 and 2 may simply butt together or they may be grooved and tongued, or shouldered to interengage with one another along their edges. In the example illustrated the lower part 2 of the lamp casing is formed with an aperture to receive a block 3 for supporting the lamp bulb 5, and carrying cable fixing bushes 4 for the current supply to the lamp. The lamp bulb 5 is mounted in a socket member 6 which has a dovetail groove engaged with a dovetail rib along the block 3, so that the focus of the lamp can be adjusted by means of screw 7 passing through the wall of lamp casing section 2.

The lamp casing also contains a polished metal reflector 8 apertured at 9 to fit over the lamp fitting, and a front glass or lens 10. The edge of the reflector 8 is shaped to fit into a groove 25 formed inside the mouth of the lamp casing 1, 2, and to receive a flange 11 formed round the front glass or lens 9, or a carrier ring therefor.

Figure 4:
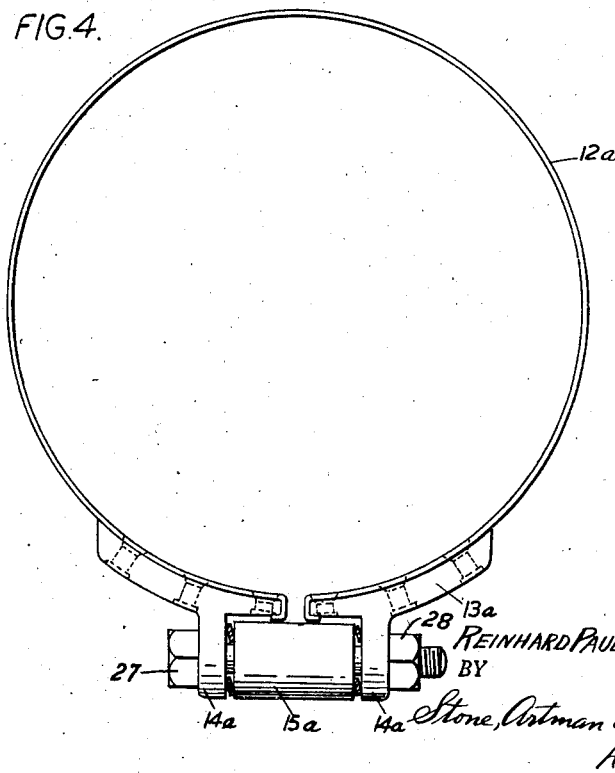
Figure 4 is a front elevation of the clamping band.

When thus assembled, the casing 1, 2 is held together by an encircling flexible strap 12, which may engage in a recess 26 moulded in the surface of the casing sections 1, 2. This strap may consist of a thin metal band, to the ends of which are riveted plates 13 having lugs 14, which are spaced apart to engage on each side of a supporting bracket 15 as shown in Figures 2 and 4. A bolt 27 passes through the lugs 14—14 and bracket 15, and by tightening up the nut 28 on the bolt 27 the band 12 may be constricted tightly about the parts 1 and 2 of the casing, and also at the same time to grip the bracket 15 between the lugs 14. The bracket 15 may be fastened on any suitable or convenient supporting structure, such as the frame of a motor vehicle.

Figure 3:
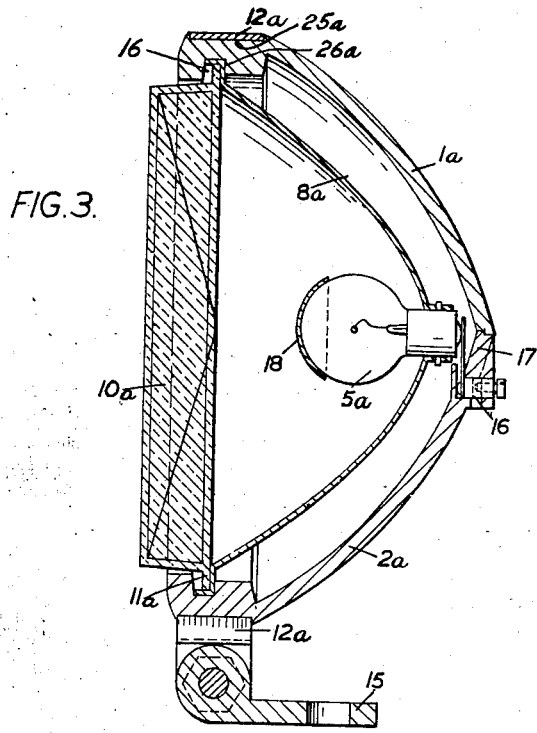
Figure 3 is a side elevation in section of another construction of head lamp.

In the construction illustrated by Figure 3, the general construction is substantially the same as that of Figures 1 and 2, but the reflector 8a does not fit close to the wall of the external casing 1a, 2a, which is thinner than in the previous construction. Thus the reflector is spaced from the wall of said casing to form an intervening air space which insulates the casing from the heat of the lamp bulb. Furthermore the lamp bulb 5a is differently mounted, being disposed with its axis horizontal instead of vertical. In both cases, however, the actual lamp filament is disposed in the geometrical axis of the reflector 8a, at or about the focal point of the reflector. In the case of Figure 3 the lamp socket is mounted in an axially disposed hole in the reflector 8a and the external leads to the lamp are inserted in terminal fittings 16 housed in lugs 17 moulded in the lower portion 2a of the lamp casing. The direct rays from the filament of the lamp bulb 5a may be screened or shielded by an opaque metal cup or shield 18, or by an opaque coating applied to the lamp bulb. In this construction the two halves 1a, 2a of the casing are shouldered along their meeting edges, so as to interlock, as previously mentioned.

A further modified construction is illustrated by Figures 5, 6 and 7. This construction is similar to that of Figure 3, inasmuch as the reflector 8b is spaced from the walls of casing sections 1b and 2b, but instead of the casing sections being held together by an encircling clamping band, they are connected together by a hinge constituted by a hinge pin 18b passing through a pair of overlapping lugs 19, moulded on the casing sections 1b and 2b. Diametrically opposite to the hinge there are a similar pair of overlapping lugs 20 adapted to be fastened together by a removable screw 21, after the reflector 8b, carrying the lamp bulb 5b, and the front glass or lens 10b, have been placed in position, engaged in the groove formed within the mouth of the casing. The leads to the lamp bulb pass into the lower part 2b of the casing through one or more holes (not shown), which may be fitted with a suitable bush, or suitable bushes.

This construction of lamp is adapted to be supported from beneath, or suspended from above, or both, to which end each half 1b, 2b of the casing is moulded with a pair of spaced lugs 22, between which is adapted to be engaged the flattened end of a supporting bolt 23 or a suspension bolt 24, whereafter a bolt or fixing pin is passed through the engaging parts. The screwed shanks of the bolts 23, 24 are fastened to the vehicle frame or other supporting structure. Preferably, an ornamental metal cap or cover is clipped over either pair of lugs 22 not used for supporting or suspending the lamp. A small drainage hole for water (not shown) may be provided at the lowest point of the rim of casing section 2b, communicating with the internal groove engaged by the reflector 8b and the front glass or lens 10b.

It will be appreciated that with all of the above described constructions the method of mounting the lamp readily permits of angular adjustment of the lamp beam, since it is only necessary for the securing bolt passing through the lugs 14 or 14a on the band 12 or 12a, or through the lugs 22 on the casing sections 1, 1a, 1b, 2, 2a or 2b to be slackened, to enable the lamp casing to be tilted backwardly or forwardly.

Instead of making the reflector 8, 8a or 8b of metal and using a glass front or lens 10, 10a or 10b, the whole optical unit for the lamp may consist also of plastic casing containing the lamp, reflector and lens, the optical unit as a whole being inserted into the body or outer casing in the normal way.

It will be understood that the lamp may be of circular, oval or other suitable cross-section, and although the invention has been described in relation to motor head lamps it is equally applicable to other purposes. For example, spherical hollow globes and hollow articles of many kinds can be built up from parts arranged to fit together and be bound or secured by flexible contractile decorative bands and the use of plastic mouldings lends itself to a wide choice in the colour and decoration of the articles.

I declare that what I claim and desire to secure by Letters Patent is:

A unidirectional lamp comprising a plurality of cast hollow wall members having a substantial thickness, and seating portions on each member whereby when the various members are assembled together with the seating portions adjacent to one another there is formed a hollow lamp casing with an opening at one end, an internal channel in that portion of each of the wall members forming the open end, which channels when in alignment will form a continuous channel, a reflector having a peripheral rim adapted to seat in said continuous channel, a lens having a peripheral rim adapted to seat against the rim of the reflector which likewise is within said continuous channel, and an external constricting means engaging the outer portion of said hollow wall members adjacent to and in radial alignment with the internal continuous channel for holding the lens, reflector and hollow wall members in assembled relationship.

REINHARD PAUL HENRY HINDS.

REFERENCES CITED

The following references are of record in the file of this patent:

UNITED STATES PATENTS

| Number | Name | Date |
|---|---|---|
| 1,687,960 | Welsh | Oct. 16, 1928 |
| 2,304,036 | Tegarty | Dec. 1, 1942 |
| 2,249,692 | Gelardin | July 15, 1941 |
| 2,231,382 | Desimone | Feb. 11, 1941 |
| 2,188,623 | Daehler | Jan. 30, 1940 |
| 1,781,865 | Aniol | Nov. 18, 1930 |
| 2,001,406 | Akers | May 14, 1935 |
| 1,435,002 | Goodwin et al. | Nov. 7, 1922 |
| 1,843,154 | Gregory | Feb. 2, 1932 |
| 1,628,460 | Godley | May 10, 1927 |
| 1,612,630 | Goodrich | Dec. 28, 1926 |
| 1,573,578 | Rosenblum | Feb. 16, 1926 |
| 2,113,919 | Korematsu | Apr. 12, 1938 |

FOREIGN PATENTS

| Number | Country | Date |
|---|---|---|
| 203,428 | British | 1923 |